Jan. 27, 1959  A. PERROT  2,870,815
APPARATUS FOR SEALING A TRANSPARENCY SLIDE
Original Filed July 6, 1955
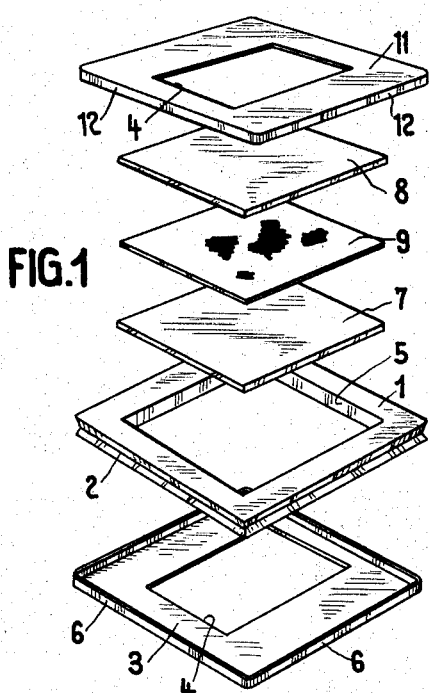
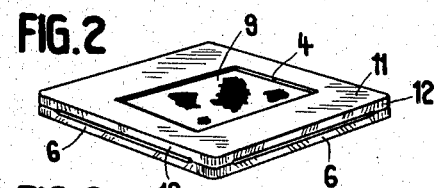
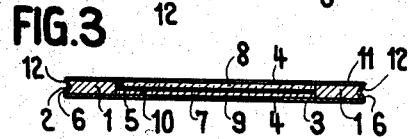
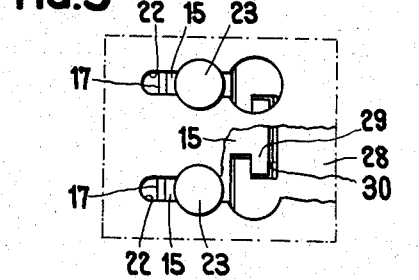
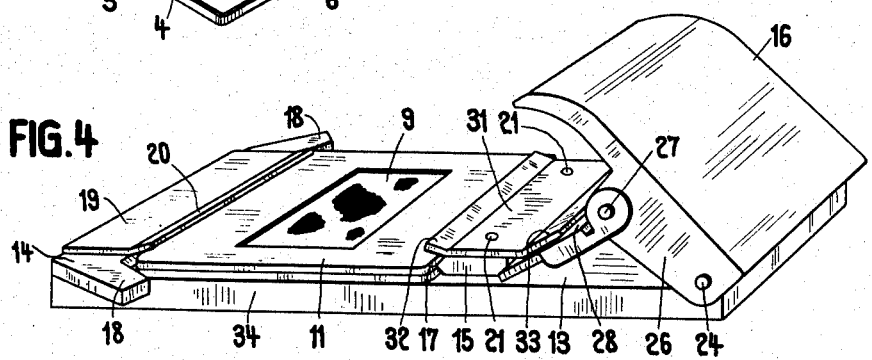
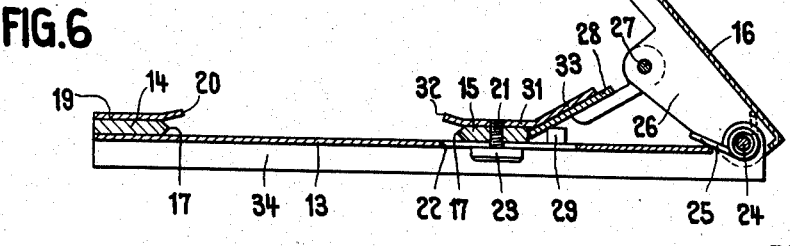
INVENTOR.
Arnold Perrot

United States Patent Office 2,870,815
Patented Jan. 27, 1959

2,870,815

APPARATUS FOR SEALING A TRANSPARENCY SLIDE

Arnold Perrot, Nidau, Switzerland

Original application July 6, 1955, Serial No. 520,259. Divided and this application October 4, 1956, Serial No. 616,907

Claims priority, application Switzerland September 13, 1954

1 Claim. (Cl. 153—1)

This is a division from application Serial No. 520,259, filed July 6, 1955.

The present invention relates to a process for manufacture of a transparency slide, which is characterized in that an inner frame is stamped out in the outer edges of which a V-shaped groove is made, a first metal mask is fixed onto the inner frame by bending the flanges of the mask against one of the walls of the V-shaped groove, two protective glasses enclosing the transparency are introduced within the inner frame, and then a second metal mask is fixed to the inner frame by bending the flanges of this second mask against the other wall of the V-shaped groove of the inner frame.

The invention also concerns the slide obtained by the above-mentioned process, as well as an apparatus for carrying out this process. The apparatus referred to is characterized in that it comprises a platen supporting on the one hand a stationary stop and on the other hand a movable stop capable of sliding towards the stationary stop under the action of a lever, both stops being formed by metal plates whose opposite sides have the shape of dihedral angles corresponding to the V-shaped groove of the inner frame, the whole being arranged in such a way that by placing the inner frame with one of the masks on the platen between both stops and by actuating the lever controlling the movable stop, two opposite flanges of the mask are simultaneously bent into the groove of the inner frame, this bending operation having to be repeated for the other pair of flanges of the mask.

The accompanying drawing shows, by way of example, an embodiment of the transparency slide and an embodiment of the apparatus according to the invention.

Fig. 1 is a perspective exploded view of the slide.

Fig. 2 is a perspective view of the slide when assembled and sealed.

Fig. 3 is a cross-sectional view of the slide shown in Fig. 2.

Fig. 4 is a perspective view of the apparatus.

Fig. 5 is an inverted-plan view at an enlarged scale of a detail of the apparatus of Fig. 4, some parts being broken away.

Fig. 6 is a cross-sectional view, at the same scale as Fig. 5, of the apparatus of Fig. 4.

For manufacturing the transparency slide shown in Figs. 1 to 3 an inner frame 1 of rectangular or square shape is first stamped out. This frame 1 may be made of any suitable material, preferably of a plastic material such as "Plexiglas" (registered trademark) or the like. A groove 2 having a V-shaped section is made in the outer edges of the frame 1. A first mask 3 whose thickness is very small with respect to that of the frame 1 is then secured to the inner frame 1. The mask 3 is formed of a metal plate having a rectangular opening 4. This opening has smaller dimensions than the opening 5 of the frame 1, for the reason indicated below. The mask 3 has on its periphery vertical flanges 6. The metal used for the mask 3 is preferably aluminum. For securing the mask 3 onto the inner frame 1, the flanges 6 are bent against one of the walls of the V-shaped groove 2. This bending operation may advantageously be made by means of the apparatus shown in Figs. 4 to 6. Fig. 3 shows the bent position of the flanges 6.

Two protective glasses 7 and 8 maintaining between them the transparency or diapositives 9 are then put in place within the inner frame 1. The thickness of the several parts of the slide is such that both glasses 7, 8 and the transparency 9 have together the same thickness as the inner frame 1 (see Fig. 3). As the opening 4 is smaller than the opening 5 of the frame 1, a bearing surface 10 is provided on the mask 3 (Fig. 3), thus maintaining the glass 7 in its axial position.

A second mask 11 similar to the mask 3 has still to be secured to the frame 1. The flanges of the mask 11 are denoted by the numeral 12. The fixation of the mask 11 is made in the same manner as that of the first mask 3, the flanges 12 bearing in their bent position against the second wall of the V-shaped groove 2.

Owing to the inner frame 1, it is practically impossible for dust to penetrate within the slide and to impair the transparency 9.

When the slides are brought onto the market and sold, the first mask 3 is already secured to the inner frame 1, so that for asembling and sealing the slide, it is sufficient to insert the glasses 7 and 8 with the transparency 9 into the frame 1 and to fix the second mask 11, the whole operation being quickly performed. If the transparency 9 of an already sealed slide is to be replaced, it suffices to tear out the mask 11 by raising its flanges 12 and to fix a new mask onto the frame 1. For this purpose spare masks are preferably sold with the complete slides.

The apparatus shown in Figs. 4 to 6 considerably facilitates the sealing of the slides described above. This apparatus comprises a platen 13 having a U-shaped section and supporting on the one hand a stationary stop 14 and on the other hand a movable stop 15 capable of sliding towards the stationary stop 14 under the action of a lever 16. Both stops 14 and 15 are formed by metal plates whose opposite sides have the shape of dihedral angles 17 corresponding to the V-shaped groove 2 of the inner frame 1 of the slides. The stationary stop 14 has two lateral horns 18 (Fig. 4) serving for centering the slide when it is being sealed. A small plate 19 fixed to the stop 14 has an extension 20 which is slightly bent upwards. The parts 14 and 19 are fixed to the platen 13 by any suitable means, for instance by spot-welding.

The movable stop 15 is traversed by two screws 21 engaging grooves 22 of the platen 13. The heads 23 of the screws 21 cause the movable stop 15 to bear against the upper face of the platen 13.

The lever 16 is pivoted on a shaft 24 journalled in the walls 34 of the platen 13. It is subjected to the action of a coil-spring 25 which tends to swing it in the clockwise direction of Fig. 6. The lever 16 has two lugs 26 in which is journalled a shaft 27. On the latter is pivoted a connecting bar 28 the free edge of which comes within reach of the movable stop 15. The stop 15 presents a T-shaped projection 29, and a cut-out part 30 of corresponding shape is provided in the bar 28, so that the members 15 and 28 are interlocked (Fig. 5). A small plate 31 is fixed to the movable stop 15 by means of the screws 21. It has on the one hand a portion 32 slightly bent upwards and on the other hand a portion 33 bearing against the connecting bar 28 when the lever 16 has the position shown in Fig. 6.

Let us assume that the second mask 11 has to be secured to the inner frame 1. The slide is placed between both stops 14 and 15 on the platen 13 of the apparatus (Fig. 4) in such a manner that the mask 11 lies on the side of the platen 13. The lever 16 is then lowered, so that the connecting bar 28 pushes the movable stop 15 towards the left of Fig. 6. The dihedral angles 17 of the stops 14 and 15 simultaneously press two opposite edges of the slide and bend the flanges 12 of the mask 11 into the V-shaped groove 2 of the inner frame 1. The lever 16 is then released and comes back into its starting position under the action of the spring 25. The stop 15 also comes back into its starting position since it is actuated by the connecting bar 28. The backward movement of the lever 16 and of the stop 15 is limited by the abutment of the bar 28 against the small plate 33.

The bent portions 20 and 32 of the small plates 19 and 31 aim at facilitating the insertion of the slide into the apparatus and prevent the slide from being lifted during the sealing operation.

The bending operation of the flanges of the mask is then repeated for the other pair of opposite flanges.

The flanges of the masks are not bent up to their ends, i. e. they remain upright at the corners of the slide, as clearly shown in Fig. 2. Therefore, a substantial reinforcement of the slide is obtained and these corners remain clean, as no accumulated material projects beyond the dimensions of the slide.

The disclosed slide for transparencies has a very low cost and its sealing by means of the apparatus described is easily performed.

While certain representative embodiments and details have been shown for the purpose of illustrating the invention, it will be apparent to those skilled in the art that various changes and modifications may be made therein without departing from the spirit or scope of the invention.

What I claim is:

In an apparatus for sealing a transparency slide having an inner frame the outer edges of which have a V-shaped groove, two protective glasses accommodated in the opening of the inner frame and enclosing a transparency, and two windowed metal masks provided with upright flanges bendable against the walls of the said V-shaped groove of the inner frame for sealing the slide: a platen provided near one end with a stationary jaw provided with two lateral horns for centering the slide, the platen having two parallel slots spaced from and extending away from said stationary jaw, a movable jaw slidable in the said slots, both jaws consisting of metal plates whose opposite sides have the shape of dihedral angles corresponding to the V-shaped groove of the said inner frame, a small plate secured to each jaw for preventing the slide from being lifted above the platen during the sealing operation, a control lever pivoted on the platen near its end remote from the stationary jaw, a return spring resting on the platen and acting on the said lever, a connecting bar linked to said lever and interlocked with said movable jaw, whereby oscillation of the lever about its fulcrum will move the movable jaw toward and away from the stationary jaw so as to bend two opposite flanges of the said masks against the walls of the V-shaped groove of the inner frame.

References Cited in the file of this patent

UNITED STATES PATENTS

| | | |
|---|---|---|
| 2,277,360 | Wagner | Mar. 24, 1942 |
| 2,432,121 | Nickell | Dec. 9, 1947 |
| 2,476,604 | Hopwood | July 19, 1949 |
| 2,636,536 | Rosenthal | Apr. 28, 1953 |

FOREIGN PATENTS

| | | |
|---|---|---|
| 272,287 | Switzerland | Dec. 15, 1950 |